United States Patent [19]

Braunstein et al.

[11] Patent Number: 5,652,318
[45] Date of Patent: Jul. 29, 1997

[54] PROCESS FOR THE PREPARATION OF FLEXIBLE EPOXY RESIN SYSTEMS

[75] Inventors: Richard Braunstein, Dorsten; Bernhard Schleimer, Marl; Felix Schmitt, Herten; Joern Volker Weiss, Haltern; Elmar Wolf, Recklinghausen, all of Germany

[73] Assignee: Huels Aktiengesellschaft, Marl, Germany

[21] Appl. No.: 655,094

[22] Filed: Jun. 4, 1996

[30] Foreign Application Priority Data

Jun. 12, 1995 [DE] Germany ............ 195 21 303.3

[51] Int. Cl.$^6$ ............... C08G 18/10; C08G 18/32
[52] U.S. Cl. ............... 528/111; 528/120; 528/123
[58] Field of Search ............ 528/111, 120, 528/123

[56] References Cited

U.S. PATENT DOCUMENTS 3,984,370  10/1976  Shinohara et al. ............ 260/37
5,459,204  10/1995  Lomoelder et al. ............ 525/409

*Primary Examiner*—Frederick Krass
*Attorney, Agent, or Firm*—Oblon, Spivak, McClelland, Maier & Neustadt., P.C.

[57] ABSTRACT

A flexible epoxy resin system is prepared by incorporating a combination of hardeners (A) and (B) in an epoxy resin, wherein the amounts of the two hardeners are varied to adjust the flexibility of the epoxy resin.

7 Claims, No Drawings

PROCESS FOR THE PREPARATION OF FLEXIBLE EPOXY RESIN SYSTEMS

BACKGROUND OF THE INVENTION

1. Field of the Invention

The invention relates to a process for the preparation of flexible epoxy resin systems, where the flexibility can be controlled as desired.

2. Description of the Background

Epoxy resins (EP resins), in particular those prepared from diphenylolpropane and epichlorohydrin, are known raw materials for the production of casting resins and coatings. Epoxy systems cured with polyamines are hard and resistant to chemicals; however, they often lack elasticity. If EP resins are to bridge cracks or be impact resistant, temperature-related stresses must be reduced or a good adhesion to aged EP resin paint films or coatings must be achieved, it is important to use a flexibilizer with the EP resin. An important property of the flexibilizer is that it must be easily incorporated into the amine-cured BP resin. The compounds described in DE-OS 21 52 606 have become accepted on the market as useful reactive flexibilizers. These compounds are polyetherpolyol-toluylenediisocyanate adducts, the free NCO groups of which are blocked by nonylphenol. However, these flexibilizers have two disadvantages which are high viscosity and short processing time of the EP resin system cured with them.

Surprisingly, it has been possible to eliminate these disadvantages by using two hardeners which are prepared by, on the one hand, mixing a diamine having a high NH-active equivalent weight, with a low molecular weight diamine, and, on the other hand, mixing said diamine having a high NH-active equivalent weight with a low molecular weight monoamine. EP resin systems which are cured with these two hardeners are flexibilized to the extent desired by incorporation of these two hardeners in specific ratios into the resin systems. A need, however, continues to exist for improved flexibilizing hardeners for EP resin systems.

SUMMARY OF THE INVENTION

Accordingly, one object of the present invention is to provide a process for preparing a flexible epoxy resin system based on a hardener combination as the flexibilizing component.

Briefly, this object and other objects of the present invention as hereinafter will become more readily apparent can be attained by a process of preparing a flexible EP resin system, by incorporating a mixture of two hardeners, as the hardener component, into the EP resin system, wherein hardener (A) has an NH-active equivalent weight of 100–300, preferably 200, and is prepared by mixing (i) a diamine containing polyether groups and urethane groups (PEDA) of the following composition:

$$H_2N-R^2-O-C(=O)-N(H)-R_1-N(H)-C(=O)-O-R-O-C(=O)-$$

-continued $$-N(H)-R^1-N(H)-C(=O)-O-R^2-NH_2 \quad (PEDA)$$

wherein
R is $$\left(CH_2-CH_2-O\right)_n, \left(CH(CH_3)-CH_2-O\right)_n, n = 20-60$$

$R^1$ is a (cyclo)alkylene radical which has 4–14 carbon atoms, optionally substituted by 1–4 $CH_3$ groups, or units of the formula I or II (I) [trimethylcyclohexyl-CH₂– structure]

(II) [benzene-1,3-bis(CH₂–) structure]

wherein
$R^2$ is an alkylene radical which has 6–20 carbon atoms, optionally substituted by 1–4 $CH_3$ groups, wherein 1–3 —$CH_2$— groups can be replaced by —O— or —$CH_3$— groups, and (ii) a diamine of the formula:

$$H_2N-R^3-NH_2 \quad (DA)$$

where
$R^3$ is a (cyclo)alkylene radical which has 2–15 carbon atoms, optionally substituted by 1–4 $CH_3$ groups, or units of the formula I or II:

(I) [trimethylcyclohexyl-CH₂– structure]

(II) [benzene-1,3-bis(CH₂–) structure]; and hardener (B) has the same NH-active equivalent weight as the 1st hardener of 100–300, preferably 200, and is prepared by mixing (i) the diamine "PEDA" containing polyether groups and urethane groups used to prepare hardener A and (ii) a monoamine of the formula:

$$H_2N-R^4$$

wherein
$R^4$ is an optionally alkyl-substituted alkyl radical having 6–20 carbon atoms, where 1–3 —$CH_2$— groups can be replaced by —O— or —NCH— groups. Each hardener (A) and (B) can comprise up to 4% of an EP catalyst.

DETAILED DESCRIPTION OF THE PREFERRED EMBODIMENTS

The present invention does not reside in the diamines ("PEDA") which contain polyether groups and urethane groups, per se, an embodiment of which (PEDA) diamine is the main component of each of hardener (A) and (B) of the process of the present invention. The preparation of the (PEDA) diamines presents no problem. Preparation of a diamine is carried out in two stages, wherein, in the first stage a polyether diol-diisocyanate adduct (NCO:OH=2:1), which, as a rule, is a polyether diolisophoronediisocyanate (IPDI) adduct, is reacted with a Schiff base containing an OH group in an OH:NCO ratio of 1:1. In the 2nd stage, the diSchiff base is hydrolysed in a known manner. Polyether diols which have proved suitable are those based on polypropylene oxide with a molecular weight of 1000–3000, preferably 2000. Suitable diisocyanates for the preparation of the diamines containing polyether groups and urethane groups include in principle all (cyclo)aliphatic diisocyanates, but isophoronediisocyanate (IPDI) is preferably employed.

To prepare hardener (A) for the process of the invention, (i) the diamine containing polyether groups and urethane groups is as a rule mixed as a 90% strength solution in benzyl alcohol with (ii) the low molecular weight diamine:

$$H_2N-R^3-NH_2 \quad (DA)$$

wherein $R^3$ is a (cyclo)alkylene radical which has 2–15 carbon atoms and is optionally substituted by 1–4 $CH_3$ groups, or the $R^3$ diradicals have the formulae I and II:

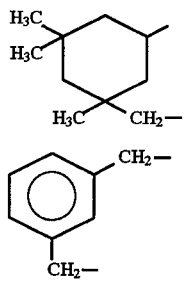

(I)

(II)

The resulting mixture has an NH-active equivalent weight of 100–300, preferably 200, and a viscosity of 5000–20,000 mPa.s. Possible diamines which can be mixed with hardener (A) include in principle all the industrially available diamines, such as, for example, ethylenediamine, 2-methylpentamethylenediamine, 2,2,4-(2,4,4)-trimethylhexamethylenediamine, Laromin C 252 (3-(Cyclohexylamino)propylamine), Laromin C 260 (3,3'-Dimethyl-4 4'-diaminodicyclohexylmethane), m-xylylenediamine, 1,2-diaminocyclohexane and isophoronediamine. The diamine which is thus employed depends in each case on the minimum flexibility which is to be achieved with hardener (A). As will be explained below, hardener (A) is the "brittle" component and hardener (B) is the "flexible component, i.e. the flexibility minimum is achieved with hardener (A). By mixing hardener (A) with hardener (B), still higher flexibilities can be obtained during curing with a given EP resin, and these resins reach their maximum flexibilities when hardener (B) is employed to cure the EP resin.

To prepare hardener (B) for the present process, the diamine (PEDA) containing polyether groups and urethane groups is as a rule mixed as a 90% strength solution in benzyl alcohol with the monoamine:

$$H_2N-R^{IV}$$

wherein $R^{IV}$ is an optionally alkyl-substituted alkyl radical having 6–20 carbon atoms, where 1–3 —$CH_2$— groups can replaced by —O— or —$NCH_3$— groups, such that the resulting mixture has an NH-active equivalent weight of 100–300, preferably 200, and a viscosity of 200–2000 mPa.s. Suitable monoamines which can be admixed to form hardener (B) include, for example, hexylamine, 2-ethylhexylamine, decylamine, dodecylamine, tridecylamine, butoxypropylamine, hexoxypropylamine, 3-(2-ethylhexoxy)-propylamine, lauryloxypropylamine, diethylaminopropylamine and 1-diethylamino-4-aminopentane. Hexoxypropylamine, 3-(2-ethylhexoxy)-propylamine and lauryloxypropylamine are preferred amines.

The EP resins cured with hardener (B) are highly flexible. Suitable epoxy resins include epoxide compounds which have more than one epoxide group and are liquid at room temperature. Epoxy resins based on bisphenol A and bisphenol F have proved to be particularly advantageous.

In order to cure EP resins by the process of the invention, it has proved expedient to add to the hardener mixture up to 4% by weight of a catalyst known for the NH/epoxide reaction such as are described, for example, in DE-OS 21 17 099, page 8. The use of DMP® 30, by Rohm and Haas, has proved to be particularly suitable.

An essential feature of the present invention is that by mixing hardeners (A) and (B) in desired amounts, the resulting mixture always has the same NH-active equivalent weight of hardeners (A) and (B), and the EP resins cured with these hardeners can have their flexibility tailor-made as desired, as a function of the weight ratio of the two hardeners. The higher the content of hardener (B) in the hardener mixture, the greater the elongation of the EP resins cured with the hardener mixture.

If EP resins are flexibilized with the compounds described in DE-OS 21 52 606, the elongation of the cured EP resins is "controlled" by the content of the flexibilizer. The higher the content of the flexibilizer in the flexibilizer/EP resin/diamine system, the greater the elongation of the cured EP system. Since these flexibilizers are highly viscous products, this is in turn associated with enormous processing problems, which are greater the greater the elongation of the cured EP system.

In the case of the present process, the flexibility of the cured EP systems is regulated by the hardener (B) content which is of low viscosity. Thus, the preparation of highly flexible EP systems presents no problems.

The mixtures prepared by the present process are suitable for coatings and casting resins for which, as already mentioned, high elasticity is important, such as, for example, top coats and floor coatings. Coatings can furthermore be employed by the process according to the invention for wear protection on metals. The flexibility and strength can be selected as desired for a given EP resin by the content of hardener (B). Increases in the amounts of hardener (B) mean an increase in elongation (%) for the same decrease in tensile strength.

Having now generally described this invention, a further understanding can be obtained by reference to certain specific examples which are provided herein for purposes of illustration only and are not intended to be limiting unless otherwise specified.

I. Preparation of the starting compounds
  A) Preparation of the NCO prepolymers
  1. 444 parts by weight of IPDI and 2000 parts by weight of a polypropylenediol having a molecular weight of about 2000 are heated at 50° C. with 1.2 parts by weight of dibutyltindilaurate for about 20 hours. The reaction product comprises 3.3% of NCO and 2.3% of free IPDI.

2a. 2100 parts by weight of 2,2,4-(2,4,4)-trimethylhexamethylenediisocyanate are heated at 80° C. with 2000 parts by weight of the polypropylene glycol employed in Example (A-1) for 1 hour. The reaction product contains 18.1% of NCO.

2b. The unreacted TMDI of the reaction product from (2a) is separated from the NCO prepolymer at 100° C./0.1 mbar. The reaction product contains 3.1% of NCO and 0.2% of free TMDI.

B) preparation of the (low molecular weight) mono-Schiff base

1. A 2 mol amount of 2-(2-aminoethoxy)-ethanol and 2.8 mol of methylisobutylketone (MIBK) are mixed at room temperature and the mixture is heated slowly up to the reflux temperature, using a water separator, and heating is then continued at this temperature until 36 parts by weight of water and about 80 parts by weight of MIBK are removed by distillation. Thereafter, the reaction product is subjected to initial distillation under a water pump vacuum (about 2% of distillate). The reaction product thus prepared can be employed for preparation of the poly-Schiff base (C) without further rectification. The $NH_2$ content of the reaction product is 5.5 mmol/g and the purity (according to GC) is >98%.

2. A 2 mol amount of 6-amino-1-hexanol and 2.8 mol of MIBK are reacted in accordance with the conditions described in Example (B-1). The reaction product comprises 5.4 mmol/g of basic N and its purity (GC) is >98%.

C) Preparation of the (higher molecular weight) di-Schiff base

1. A 1273 parts by weight amount of the NCO prepolymer (A-1) and 182 parts by weight of the mono-Schiff base (B-1) were mixed intensively and the mixture was left to stand at 60° C. until the NCO content of the reaction mixture was <0.1% (about 20 hours).

2. A 1355 parts by weight amount of the NCO prepolymer (A-2b) and 182 parts by weight of the mono-Schiff base (B-1) were reacted as in (C-1) and the mixture was left to stand at 60° C. until the NCO content of the reaction mixture was <0.1%.

3. A 1273 parts by weight amount of the NCO prepolymer (A-1) and 185 parts by weight of the mono-Schiff base (B-2) were mixed as described in (C-1) and the mixture was left to stand at 60° C. until the NCO content of the reaction mixture was <0.1%.

D) Hydrolysis of the di-Schiff base C)
General preparation instructions

The $H_2O$, warmed to about 70° C. (50% of the product employed), is added to the di-Schiff base (C), which has been heated to about 50° C., in the course of 0.25 hour while stirring intensively. After $H_2O$ has been added, heating is continued at 60° C. for about 0.5 hour more while stirring intensively. The $H_2O$ and MIBK are then removed by distillation under a water pump vacuum.

1. The di-Schiff base (C-1) was hydrolyzed as described above;

$NH_2$ [mmol/g]: 0.55

Viscosity (23° C.) mPa.s: 105,300

2. Hydrolysis of the di-Schiff base (C-2) gave a diamine having the following properties:

$NH_2$ [mmol/g]: 0.52

Viscosity (23° C.) mpa.s: 15,960

3. Hydrolysis of the di-Schiff base (C-3) as described above gave a diamine having the following properties:

$NH_2$ [mmol/g]: 0.5

Viscosity (23° C.) mpa.s: 125,200

E) Preparation of the hardeners employed in the process according to the invention 1. The diamine (D-1) (as a 90% strength solution in benzyl alcohol) was mixed with IPD such that the mixture had:

a) an NH-active equivalent weight of 250 and a viscosity (23° C.) of 12,200 mPa.s;

b) an NH-active equivalent weight of 190 and a viscosity (23° C.) of 7500 mPa.s.

2. The diamine (D-1) (as a 90% strength solution in benzyl alcohol) was mixed with 3-(2-ethylhexoxy) propylamine such that the mixture had:

a) an NH-active equivalent weight of 250 and a viscosity (23° C.) of 850 mPa.s;

b) an NH-active equivalent weight of 190 and a viscosity (23° C.) of 220 mPa.s.

3. The diamine (D-2) was mixed with IPD such that the mixture had:

a) an NH-active equivalent weight of 250 and a viscosity (23° C.) of 6700 mPa.s;

b) an NH-active equivalent weight of 190 and a viscosity (23° C.) Of 570 mPa.s.

4. The diamine (D-2) was mixed with 3-(2-ethylhexoxy)-propylamine such that the mixture had:

a) an NH-active equivalent weight of 250 and a viscosity (23° C.) of 560 mPa.s;

b) an NH-active equivalent weight of 190 and a viscosity (23° C.) of 340 mPa.s.

II. Production of the flexible EP coatings by the process of the invention

A 190 parts by weight amount of an EP resin based on bisphenol A and epichlorohydrin was mixed intensively with the equivalent amount of a hardener mixture (A) and (B) and 2% of trisdimethylaminomethylphenol (DMP 30) and, after about 10 minutes, the mixture was cast into sheets 4 mm thick and left to stand at room temperature for 14 days. The cured sheets are transparent and non-tacky.

Physical data (see for example Table 1 and 2) were determined on systems 1, 2 and 3 by the following methods.

a) Shore hardness (DIN 53 505)

b) Tensile strength δ (N/mm$^2$) (DIN 53 455)

c) Elongation ε (%)

d) Tear propagation resistance TP (N/mm) (DIN 53 515)

1. EPIKOTE 828, the hardener mixture of (E-1b) and (E-2b), and 2% of DMP 30 were cured as described in the instructions above. The composition of the resin/hardener mixture and the data (Shore A, δ, ε, TP) are shown in Table 1 (Examples 1.1 to 1.9).

2. EPIKOTE 828, the hardener mixture of (E-1a) and (E-2a), and 2% of DMP 30 were cured as described in the instructions above. The composition of the resin/hardener mixture and the data (Shore A, δ, ε, TP) are shown in Table 2 (Examples 2.1 to 2.6).

2. EPIKOTE 828, the hardener mixture of (E-3a) and (E-4a), and 2% of DMP 30 were cured as described in the instructions above. The composition of the resin/hardener mixture and the data (Shore A, δ, ε, TP) are shown in Table 3 (Examples 3.1 to 3.6).

TABLE 1

| Example No. | | 1.1 | 1.2 | 1.3 | 1.4 | 1.5 | 1.6 | 1.7 | 1.8 | 1.9 |
|---|---|---|---|---|---|---|---|---|---|---|
| Epikote 828 | EP EW: 190 | 10 | 10 | 10 | 10 | 10 | 10 | 10 | 10 | 10 |
| Hardener (A) (E.1.b) | NH EW: 190 | 10 | 9.4 | 8.7 | 8 | 7.2 | 6.2 | 5.2 | 3.2 | — |
| Hardener (B) (E.2.b) | NH EW: 190 | — | 0.6 | 1.3 | 2 | 2.8 | 3.8 | 4.8 | 6.8 | 10 |
| Catalyst | | ← 2% of DMP 30 → | | | | | | | | |
| Processing time, 100 g quantity | | >3 h | 3.5 h | 3.5 h | 3.5 h | 4 h | 4.5 h | 5 h | 6 h | >6 h |
| Curing course, | 1st d | — | 60 D | 60 D | 60 D | 57 D | 54 D | 47 D | 37 D | — |
| Shore hardness, | 3rd d | 70 D | 67 D | 67 D | 67 D | 67 D | 67 D | 63 D | 59 D | 65 D |
| room temperature | 7th d | 72 D | 72 D | 72 D | 72 D | 68 D | 68 D | 63 D | 60 D | 76 D |
| | 14th d | 76 D | 73 D | 73 D | 73 D | 71 D | 68 D | 63 D | 62 D | 76 A |
| Shore hardness, heated for 1 h at 80° C. + 2 h at 100° C. | | 76 D | 71 D | 69 D | 68 D | 65 D | 58 D | 58 D | 38 D | 24 A |
| Tensile test | | | | | | | | | | |
| Elongation at break, % | | 40 | 30 | 25 | 30 | 35 | 54 | 64 | 120 | 350 |
| Tear strength, N/mm² | | 25 | 25 | 23 | 23 | 22 | 20 | 18 | 15 | 6 |
| 14 d at RT | | | | | | | | | | |
| Elongation at break, % | | 20 | 34 | 30 | 40 | 40 | 60 | 84 | 170 | — |
| Tear strength, N/mm² | | 30 | 30 | 26 | 25 | 19 | 17 | 16 | 10 | — |
| heated for 1 h at 80° C. + 2 h at 100° C. | | | | | | | | | | |

TABLE 2

| Example No. | | 2.1 | 2.2 | 2.3 | 2.4 | 2.5 | 2.6 |
|---|---|---|---|---|---|---|---|
| Epikote 828 | EP EW: 190 | 76 | 76 | 76 | 76 | 76 | 76 |
| Hardener (A) (E.1.a) | NH EW: 250 | 100 | 80 | 60 | 40 | 20 | — |
| Hardener (B) (E.2.a) | NH EW: 250 | — | 20 | 40 | 60 | 80 | 100 |
| Catalyst | | ← 2% of DMP 30 → (based on Σ resin + hardener) | | | | | |
| Curing | | ← 14% d at room temperature → | | | | | |
| Shore hardness | | 68 D | 63 D | 58 D | 57 D | 44 D | 72 A |
| Tear strength N/mm² | | 21.1 | 19.5 | 18.7 | 15.1 | 12 | 9.7 |
| Elongation at break % | | 33 | 89 | 156 | 196 | 275 | 640 |
| Tear propagation resistance N/mm | | 63 | 65 | 66 | 54 | 36 | 20 |

TABLE 3

| Example No. | | 3.1 | 3.2 | 3.3 | 3.4 | 3.5 | 3.6 |
|---|---|---|---|---|---|---|---|
| Epikote 828 | EP EW: 190 | 76 | 76 | 76 | 76 | 76 | 76 |
| Hardener (A) (E.3.a) | NH EW: 250 | 100 | 80 | 60 | 40 | 20 | — |
| Hardener (B) (E.4.a) | NH EW: 250 | — | 20 | 40 | 60 | 80 | 100 |
| Catalyst | | ← 2% of DMP 30 → (based on Σ resin + hardener) | | | | | |
| Curing | | ← 14% d at room temperature → | | | | | |
| Shore hardness | | 67 D | 62 D | 56 D | 55 D | 42 D | 70 A |
| Tear strength N/mm² | | 20.5 | 20.1 | 18.3 | 16 | 11.6 | 8.7 |
| Elongation at break % | | 30 | 82 | 146 | 187 | 283 | 590 |
| Tear propagation resistance N/mm | | 61 | 63 | 58 | 51 | 31 | 22 |

What is claimed as new and desired to be secured by Letters Patent of the United States is:

1. A process for preparing a flexible epoxy resin system, comprising:

mixing with an epoxy resin a hardener composition comprising a combination of:

Hardener (A) which has an NH-active equivalent weight of 100–300 and is prepared by mixing (i) a diamine containing polyether groups and urethane groups (PEDA) of the following composition:

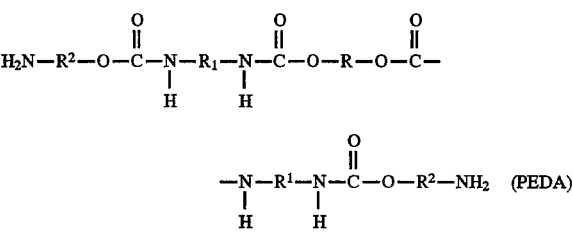

wherein
R is

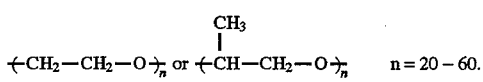

$R^1$ is a (cyclo)alkylene radical which has 4–14 carbon atoms, and is optionally substituted by 1–4 $CH_3$ groups, or units of the formula I or II

wherein
$R^2$ is an alkylene radical which has 6–20 carbon atoms, optionally substituted by 1–4 $CH_3$ groups, wherein 1–3 —$CH_2$— groups can be replaced by —O— or —$NCH_3$— groups, and (ii) a diamine of the formula:

where $R^3$ is a (cyclo)alkylene radical which has 2–15 C atoms, optionally substituted by 1–4 $CH_3$ groups, or units of the formula I or II

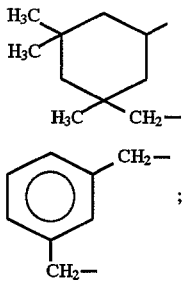

Hardener (B) which has the same NH-active equivalent weight as Hardener (A) of 100–300, and is prepared by mixing the (i) diamine (PEDA) containing polyether groups and urethane groups and (ii) a monoamine of the composition:

where $R^4$ is an optionally alkyl-substituted alkyl radical having 6–20 C atoms, where 1–3 —$CH_2$— groups can be replaced by —O— or —$NCH_3$— groups; the weight ratio of hardeners (A) and (B) ranging from 1:99 to 99:1.

2. The process of claim 1, wherein said diamine (ii) is selected from the group consisting of ethylenediamine, 2-methylpentamethylenediamine, 2,2,4-(2,4,4)-trimethylhexamethylenediamine, 3-(Cyclohexylamino)propylamine, 3,3'-Dimethyl-4,4'-diaminodicyclohexylmethane, m-xylylenediamine, 1,2-diaminocyclohexane and isophoronediamine.

3. The process of claim 1, wherein said Hardener (A) has an NH-active equivalent weight of 190.

4. The process of claim 1, wherein monoamine (ii) is a member selected from the group consisting of hexylamine, 2-ethylhexylamine, decylamine, dodecylamine, tridecylamine, butoxypropylamine, hexoxyproylamine, 3-(2-ethylhexoxy)propylamine, lauryloxypropylamine, diethylaminopropylamine and 1-diethyl-amino-4-aminopentane.

5. The process of claim 1, wherein the epoxy resin is based on bisphenol A and bisphenol F.

6. The process of claim 4, wherein said monoamine is selected from the group consisting of hexoxypropylamine, 3-(2-ethylhexoxy)propylamine and lauryloxypropylamine.

7. The process of claim 1, wherein the epoxy resin-hardener composition further contains up to 4% by weight of a catalyst which catalyzes the NH/epoxide reaction.

* * * * *